United States Patent [19]

Tangorra

[11] Patent Number: 4,697,674
[45] Date of Patent: Oct. 6, 1987

[54] OLEOELASTIC ENERGY ACCUMULATOR

[75] Inventor: Giorgio Tangorra, Monza, Italy

[73] Assignee: Industrie Pirelli S.p.A, Milan, Italy

[21] Appl. No.: 745,229

[22] Filed: Jun. 17, 1985

[30] Foreign Application Priority Data

Jun. 25, 1984 [IT] Italy ............... 21582 A/84

[51] Int. Cl.$^4$ .................. F16F 9/04; F16F 9/08
[52] U.S. Cl. .................. 188/298; 92/98 R;
92/103 R; 92/103 F; 138/30; 267/64.27;
267/122
[58] Field of Search .................. 267/122–123,
267/113, 118, 121, 124, 140.1, 141.6, 152, 64.27,
64.25, 35, 64.11, 64.23, 64.24, 141; 188/298;
138/30, 31, 174, 172; 92/75, 98 R, 98 D, 103,
103 R; 220/85 B; 303/87

[56] References Cited

U.S. PATENT DOCUMENTS

| 2,383,180 | 8/1945 | Ellinwood | 138/30 X |
|---|---|---|---|
| 2,452,176 | 10/1948 | Bent | 267/64.27 X |
| 2,504,424 | 4/1950 | Kraak | 138/30 |
| 2,540,676 | 2/1951 | Johnson et al. | 138/30 |
| 2,773,511 | 12/1956 | Mercier | 138/30 |
| 2,883,180 | 4/1959 | Moulton | 267/35 |
| 2,914,089 | 11/1959 | Allinquant | 267/64.27 X |
| 2,941,549 | 6/1960 | Mard | 138/30 |
| 2,959,194 | 11/1960 | Mercier | 138/30 |
| 3,130,965 | 4/1964 | Niclas | 267/64.27 |
| 3,287,008 | 11/1966 | Fernandez | 188/298 X |
| 3,485,258 | 12/1969 | Greene | 92/98 R X |
| 3,522,941 | 8/1970 | Henry-Biabaud | 267/64.27 |
| 3,523,857 | 8/1970 | Crosland | 92/103 F X |
| 3,549,142 | 12/1970 | Tilton | 92/103 F X |
| 3,584,331 | 6/1971 | Hooge | 188/298 X |
| 3,606,592 | 9/1971 | Madurski et al. | 92/103 F X |
| 3,675,684 | 7/1972 | Mercier et al. | 138/30 |
| 3,799,037 | 3/1974 | Schmidt | 92/98 R |
| 3,802,465 | 4/1974 | Crankshaw | 138/31 |
| 3,840,245 | 10/1974 | Aikawa et al. | 267/64.25 X |
| 3,872,777 | 3/1975 | Mastis | 92/103 F X |
| 3,993,295 | 11/1976 | Suzuki et al. | 267/152 |
| 4,010,829 | 3/1977 | Naito et al. | 188/298 X |
| 4,050,358 | 9/1977 | Humberstone et al. | 92/103 F |
| 4,234,172 | 11/1980 | Takahashi | 267/122 X |
| 4,271,869 | 6/1981 | Weidl et al. | 267/122 X |
| 4,298,030 | 11/1981 | Mercier | 138/30 |
| 4,468,016 | 8/1984 | Pineau | 267/141 |
| 4,470,583 | 9/1984 | Peiffer et al. | 267/64.27 X |
| 4,573,656 | 3/1986 | Yoshida et al. | 267/35 X |
| 4,619,436 | 10/1986 | Bonzer et al. | 92/103 F X |

FOREIGN PATENT DOCUMENTS

| 0071112 | 2/1983 | European Pat. Off. | |
| 1129845 | 5/1962 | Fed. Rep. of Germany | 267/64.25 |
| 1963709 | 7/1971 | Fed. Rep. of Germany | |
| 0143834 | 11/1981 | Japan | 267/122 |
| 383541 | 11/1932 | United Kingdom | 138/30 |
| 1249197 | 10/1971 | United Kingdom | 138/30 |

Primary Examiner—Douglas C. Butler
Attorney, Agent, or Firm—Stevens, Davis, Miller & Mosher

[57] ABSTRACT

An oleoelastic energy accumulator includes a rigid casing, at least one membrane of a polymeric material having a high deformability, and a liquid. The membrane has a curvilinear form, e.g., convex, toward the inside of the casing to the borders of which the membrane is tightly sealed for delimiting or defining a closed space occupied by the liquid. In correspondence with the pressure variations in the liquid, the membrane acts like a piston and passes from an at-rest, curvilinear configuration, to a final substantially flat configuration as a result of gradual and successive compression of the membrane which, in this manner, accumulates energy.

7 Claims, 14 Drawing Figures

OLEOELASTIC ENERGY ACCUMULATOR

DESCRIPTION

The present invention relates to an energy accumulator, and more particularly, to an energy accumulator of the oleoelastic type made of a polymeric material, which is, in particular, elastically deformable when compressed through the action of a liquid.

As is already well known, energy accumulator devices of various types are quite widely available, wherein one or more elements of an elastically deformable polymeric material, in particularly an elastomer, are subjected to deformations through the action of external forces for the purpose of accumulating and later restoring energy whenever the application of the cited forces ceases.

A first type of such devices comprises one or more strip-like elastomeric elements that are subjected to traction, and consequently elongated for absorbing energy.

A second type of such devices comprises one or more elastomeric elements that are deformed under compressive forces for accumulating energy.

The present application is directed to the second type of said cited devices, which will be referred henceforth herein as an oleoelastic energy accumulator that is deformable under compression.

Among the energy accumulators adapted for absorbing energy through compression of a polymeric material, there is known one embodiment—described in U.S. Pat. No. 3,993,295—that, in a cylindrical casing, comprises: a plurality of polyurethane cones spaced apart by elastomeric guiding elements having a contrasted conicity. At one extremity of cylinder, moreover, there is disposed a piston applied with one side facing the outermost cone in the row of cones, and with the opposite side of the piston subject to the action of a liquid whose thrust determines the compression of the cones until inversion of the conicity of said cones is caused on the cited guiding elements.

In some instances this embodiment can present an excessive dissipation of energy, caused by the sliding of the cones along the guiding elements, with the drawback of successively restoring only part of the energy accumulated.

Moreover, the presence of the guiding elements between one cone and the other results in an assembly of a plurality of parts which, although not participating directly towards the accumulation of energy, under certain conditions requires an incompatible overall dimension for the accumulator as far as regards available space.

A further drawback of the known embodiment consists in the doubling of the mechanisms necessary for the energy accumulator, since there is provided a first element formed by a rigid piston and by a liquid acting on one side of said rigid piston for determining the compression-thrust, and a second element, for the real and proper accumulation of energy, constituted by cones and by guiding elements that are spaced with respect to the elastomeric cones.

There are still other kinds of energy accumulators that are deformable under force. Nevertheless, and generally speaking, their use does not appear satisfactory for all applications—either owing to drawbacks arising from their excessive weight and/or to drawbacks caused by it being quite impossible for them to accumulate great quantities of energy by an embodiment that is at the same time simple, of immediate response, and reliable.

Hence, the object of the present invention is to provide an oleoelastic energy accumulator functioning under compressive force, of the type that utilizes an elastically deformable polymeric material, and which is devoid of any of the previously-cited drawbacks.

The object of the present invention is an oleoelastic energy accumulator characterized in comprising: a casing, at least one deformable elastomeric membrance, and a liquid, the same membrane being disposed with a curvilinear form towards the interior of the casing to whose borders it is tightly sealed, for delimiting an enclosed space occupied by said liquid, with said membrane acting as a piston when subjected to the pressure of said liquid in order to pass from a first at-rest curvilinear configuration to a final substantially flat configuration, by means of a gradual and successive compression, for its entire extension.

Therefore, what constitutes a fundamental characteristic of the present invention is an elastically deformable polymeric membrane forming the cover of a rigid casing which is subjected to the thrust of a liquid on one of the faces of its curvilinear form, towards the casing's interior, that functions simultaneously both as an element that is gradually deformable through compression for accumulating energy, as well as like a piston for obtaining, through a variation of the volume inside the casing, the necessary pressure variation in the liquid for thus accumulating energy.

In practice, the energy accumulator according to this invention acts as a container of variable volume that is occupied by an incompressible liquid, whereby the successive volume variations inside the casing are translated into successive gradual stages for accumulating energy, in correspondence to the diverse geometrical configurations of the membrane, through the passage from an initial, more or less convex, curvilinear form towards the liquid to a final substantially flat form.

The present invention will be still better understood from the following detailed description, made solely by way of non-limiting example, with reference to the figures of the accompanying drawings, wherein.

Figure 1:
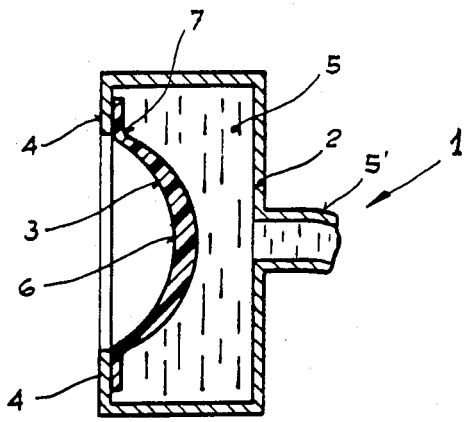
FIG. 1 shows a cross-section of the energy accumulator according to this invention.
Figure 3:
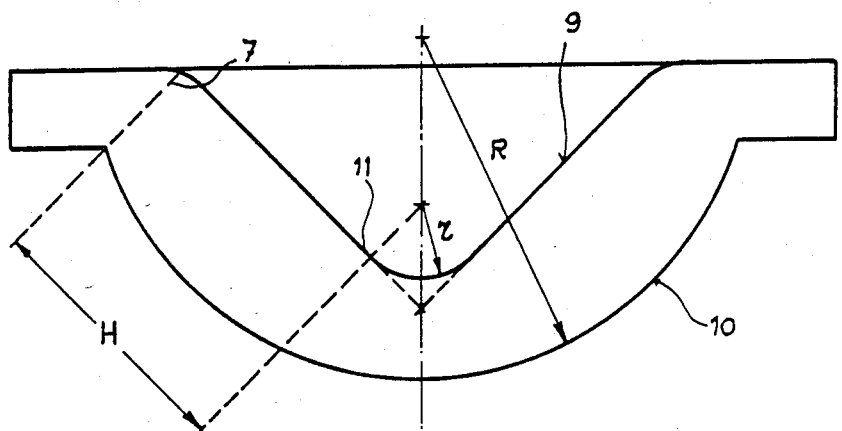
Figure 4A:
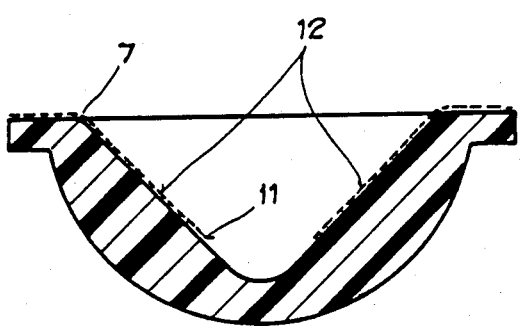
Figure 4B:
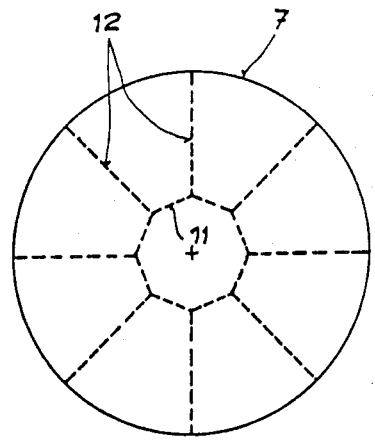
Figure 5:
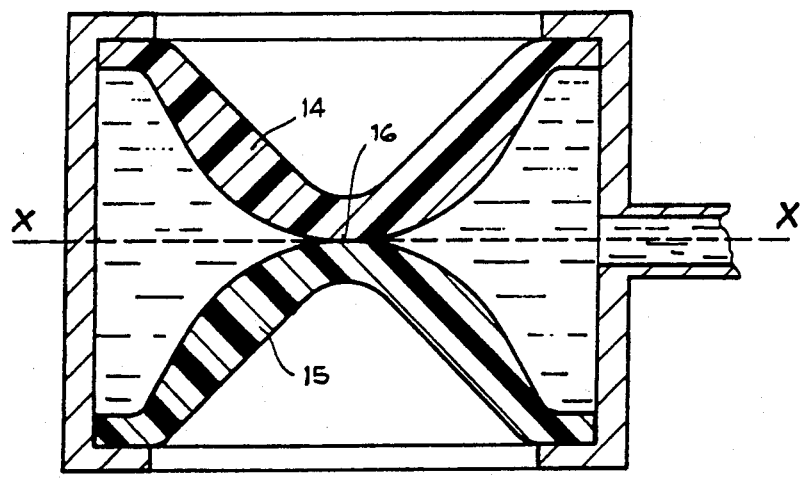
Figure 6:
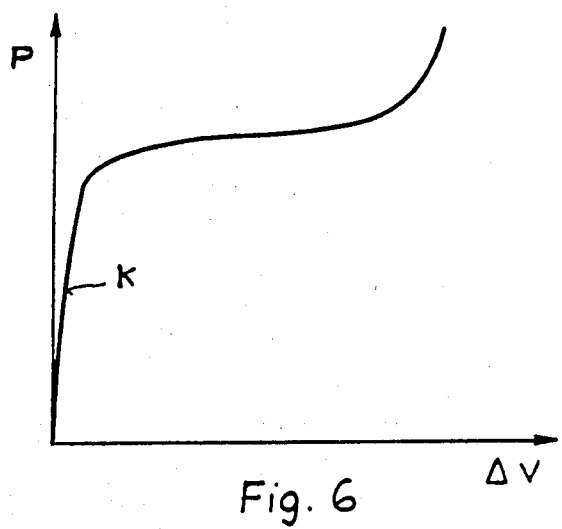
Figure 7:
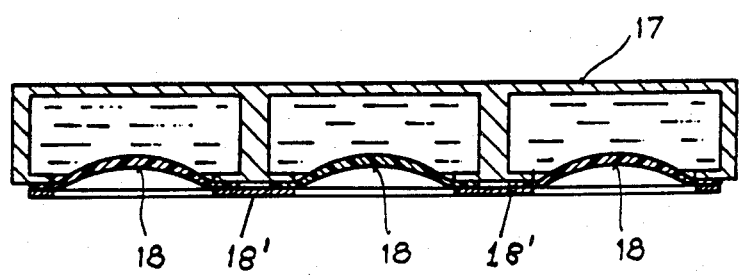
Figure 8:
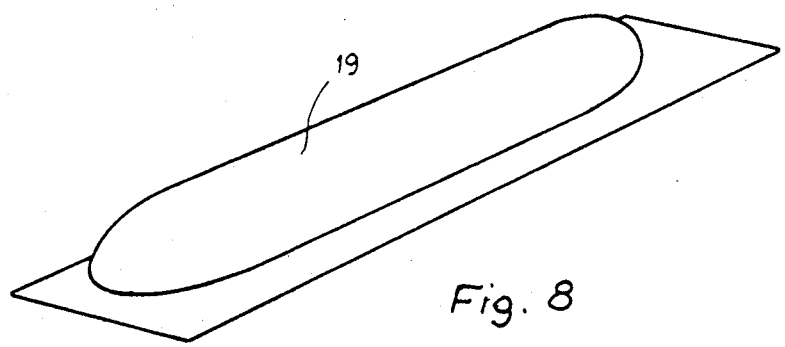
Figure 9:
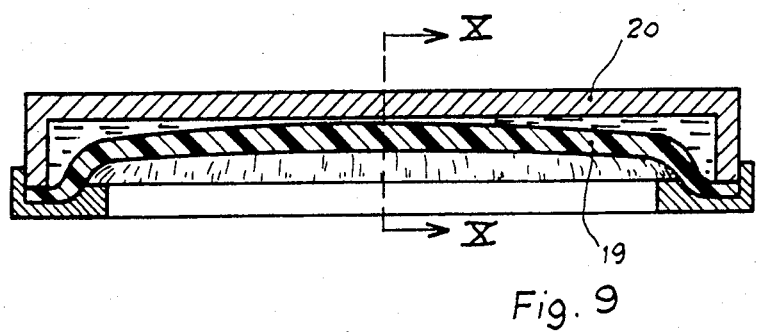
Figure 10:
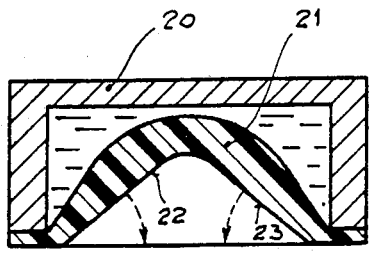
Figure 11:
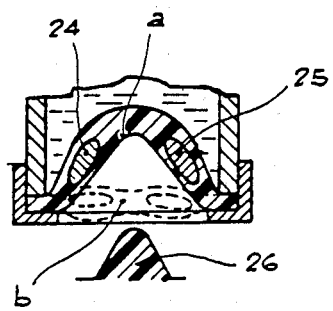
Figure 13:
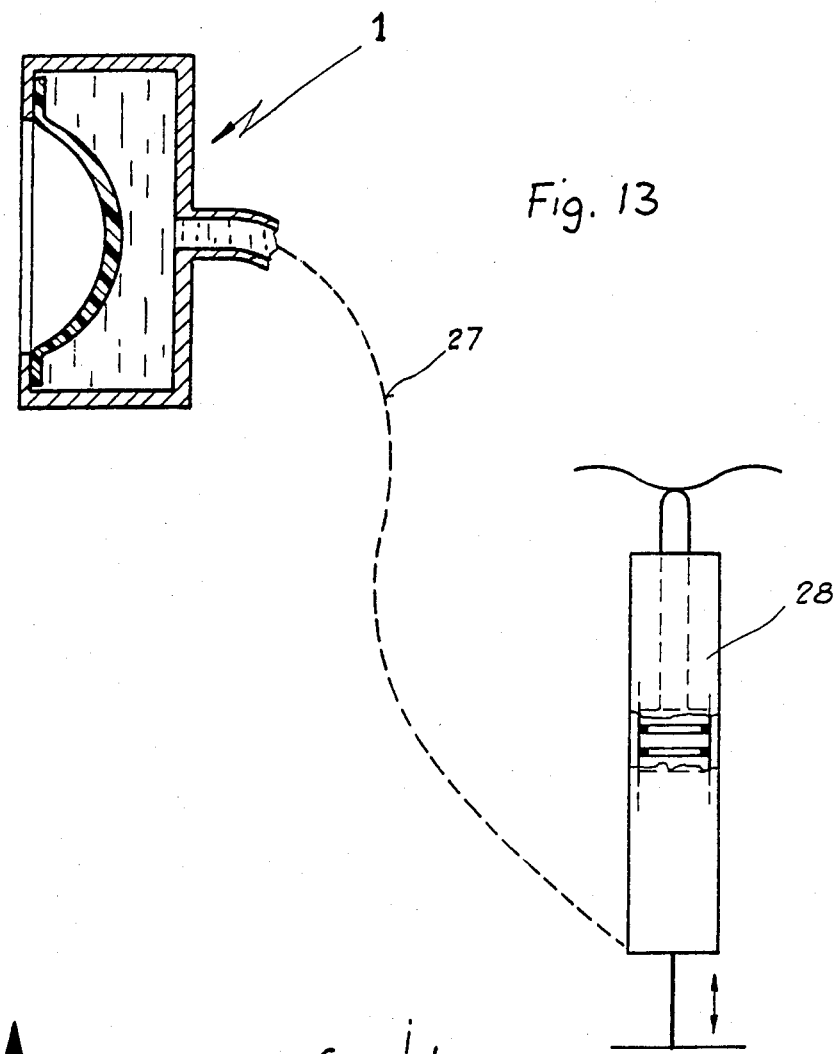
Figure 12:
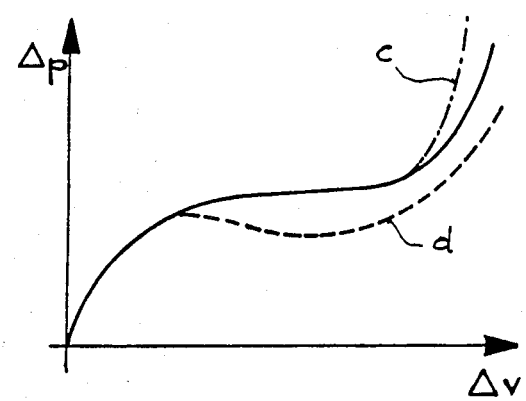

FIG. 3 schematically emphasizes a preferred embodiment of the membrane of FIG. 1;

FIGS. 4a and 4b illustrate some stiffening or reinforcing means on the outer face of the membrane;

FIG. 5 illustrates an accumulator provided with two membranes disposed opposite each other;

FIG. 6 represents the slope of the force/movement curve of the membrane when it is mounted in a precompressed state;

FIGS. 7 and 8 represents some alternative variations of the invention;

FIG. 9 represents the embodiment of FIG. 8 of the invention that is adapted for realizing great volume variations inside the rigid casing of the accumulator;

FIG. 10 is a section taken along the line X—X of FIG. 9;

FIG. 11 represents a further embodiment of the membrane;

FIG. 12 is a curve showing the volume variations and the consequent pressure variations in one embodiment of the accumulator according to the invention, characterized by special ledge means for the outer surface of the membrane; and FIG. 13 shows an application of the accumulator of the present invention to a car suspension.

In its more general form, the oleoelastic energy accumulator 1 (FIG. 1) comprises a rigid casing 2, an elastically deformable polymeric membrane 3, and a liquid—in particular, an oil or other hydraulic pressure fluid.

The membrane 3 is disposed, with a curvilinear form, towards the interior of the casing 2 to whose borders 4 it is tightly sealed for thus delimiting a closed space 5 occupied by the liquid.

The casing 1 is provided with an opening connected to a conduit 5', for the introduction of the liquid into the closed space.

On the conduit 5' there may be provided a suitable valve (not shown) for controlling the in-flow of liquid.

In all embodiments of the invention, the liquid occupies the entire space defined by the membrane 3, the casing 2, and the small in-flow conduit 5'.

The membrane may be formed out of diverse polymeric materials which have a high deformability; and in particular, out of elastomers—for example, of polyurethane or nitrile rubber, or any other type of polymer that presents an adequate covering on its interior resistant to the hydraulic pressure fluid.

The choice of elastomeric material may be one based on rubber, or one having a high hysteresis—depending upon whether it is desired to have for any particular application, respectively, a low hysteretic loss of energy or a high hysteretic loss of energy.

The rigid type of casing 2, made of steel or of a rigid plastic material, may assume other forms than those shown in FIG. 1, and also may have any profile whatsoever, and the borders 4 of the casing may assume any configuration whatsoever, provided that no matter what configuration is adopted it provides a perfect sealing between membrane 3 and the borders 4 of the casing 2.

Figure 2:
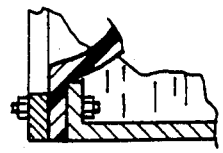
FIG. 2 represents a particular embodiment of a means for fixing the membrane to the casing of the accumulator.

One particular embodiment for bonding the membrane with the borders of the casing may be the known rubber-to-metal type, or for a clamping between the parts, as is quite simply shown in FIG. 2. The clamping, in many cases, may even be effectuated through mechanical operations, such as calking, or rolling on the coupling surface of the sealed flat metallic band.

The liquid used in the container may be an oil whose viscosity is a function of the particular usage for the accumulator, i.e., it can be a liquid having either a high or a low viscosity, respectively, should the applications of the accumulator require a low or a high damping effect in the presence of the cyclic oscillations of force exercised on the membrane.

In the preferred embodiments, the membrane that is shown schematically in FIG. 1 is characterized in comprising thicknesses in correspondence to the zones, respectively the central zone 6 and the peripheral zone 7, having a lesser value relative to the rest of the membrane.

Said zones having relatively lesser thicknesses are destined to form hinges when the membrane passes from its at-rest configuration to the final one. In practice, according to one embodiment (illustrated in FIG. 3), the membrane comprises an external surface 9 having a conical form, and an inner spherically-shaped surface 10 with radius R.

Said conical and spherical configuration between the two surfaces is well adapted for providing a hinge-zone at the center of the membrane.

The membrane shown in FIG. 3 is further characterized in comprising a maximum thickness at the point between the central zone 11 and the peripheral zone of the edge 7 that is between 0.3 and 0.6 times the distance H between the central and the peripheral zones.

The central zone 11 is indicated by the point of tangency between the conical surface and the central circular zone of connection having a radius r.

In one embodiment, the maximum thickness of the membrane is about one-half of the length H.

As an alternative to the embodiment just mentioned, the accumulator may comprise a membrane formed by an outer surface having the form of a dihedral angle, radiused in the center, and an internal substantially cylindrical surface.

In a still further embodiment, the accumulator may comprise (FIG. 4a) stiffening means 12, disposed substantially on the outer concave face of the membrane in the proximity of the border of the casing, i.e., between the boundary limit 11 of the central zone and the border zone.

These stiffening means may be embedded in the proximity of the outermost face of the membrane.

The stiffening means are for preventing any state of tractional stress on the rubber on the outer portion of the membrane, whenever the membrane moves under the thrust of the liquid, from the curvilinear configuration of FIG. 1 to the successive configurations. Said stiffening means may comprise wires or other similar inextensible longitudinally extending elements that are directed substantially towards the center of the membrane, for example, KEVLAR textile threads, or nylon or polyester fibers, or even thin metallic wires having a thickness of about 0.2 mm.

As an alternative, said stiffening means may be formed out of fabrics having, in general, a form like a netting, or with a configuration similar to that illustrated in the front view of the membrane as shown in FIG. 4b.

The functioning principle of the accumulator is based upon the thrust exercised by the pressurized liquid against the inner face of the membrane, with the consequent accumulation of energy, due to the fact that the membrane, upon passing from the curvilinear configuration to the successive configurations towards the final one, is forced to become compressed and, in this manner, accumulating energy elastically.

The above-stated functioning principle for the accumulator of FIG. 1 is valid for further embodiments, wherein, for example, the accumulator may comprise several membranes.

This last-mentioned embodiment is shown schematically in FIG. 5, showing two membranes 14 and 15 that are symmetrical with respect to a plane X—X. Therefore the rigid casing comprises only the lateral walls, and it still has the double function of fixing the borders of the two oppositely disposed membranes and of containing the liquid.

Preferably, both the membrane of FIG. 1 as well as the two membranes of FIG. 5 are applied and mounted in a precompressed state, being in contact along the central zone 16, i.e., for obtaining a considerably initial slant K of the membrane, as is shown in the diagram of the curve of FIG. 6, where, in the abscissa, there is shown the volume variation Δv of the accumulator and, in the ordinate, the pressure P of the liquid, to which corresponds a certain degree of energy accumulation. Said mounting technique can be usefully applied even when using cylindrical membranes—in which case said FIG. 5 is to be interpreted as a cross-section through the axis of the cylinders.

In FIG. 7 there is illustrated an accumulator comprising a single container 17 provided with a cover, formed by several cap-shaped membranes 18 spaced apart by metallic plates 18'. This structure is distinguished by a plurality of chambers, either communicating or not with one another, depending upon whether an embodiment is chosen where the liquid, adapted for determining the thrust of the membrane, presses first upon a single membrane and then through special valves controlled from the outside upon the other membranes, with, in this way, passing from one chamber to the other.

Otherwise, in still another embodiment, the liquid presses simultaneously against all the membranes, since the chambers are in direct communication with each other.

FIGS. 8 and 9 represent an embodiment wherein the accumulator, according to the present invention, comprises a single elastomeric membrane 19 forming the cover of the cylindrical casing 20, whose cross-section is shown in FIG. 10.

This embodiment is particularly useful in instances where considerable volume variations are desired during the passage from the at-rest configuration 21 to a successive configuration, whereby the walls 22, 23 (FIG. 10) are directly opposed to each other, until they become aligned along a substantially flat plane.

FIG. 11 represents a further alternative variation, wherein the membrane comprises within it harder elements 24, 25, with respect to the rest of the elastomeric part of the same membrane. These elements may be continuous metallic elements, or rigid plastic elements, or even a suitable compound that is harder with respect to the remaining elastomeric portion of the membrane.

In this embodiment, when the liquid presses against the membrane a phase is had of successive positionings of the membranes from the position shown with a full-line, to the final position shown with a broken-line in FIG. 11.

The area inside the two lines, indicated by a and b, represents the increase in the space at the disposal of the liquid.

During the volume variation of the container that collects the liquid, experience shows that the membrane—thanks to the presence of the harder elements inside it—shifts with squashing through the applied force the zones between the central cap and between the harder elements and between these latter and the borders of the casing, then returning to its starting position when the liquid has ceased its pressing action, with a rapidity that is controlled by the contrasting resistances to any exiting of the liquid, by the hydraulic circuit.

In practice, the presence of the harder elements 24, 25 favors the formation of the central and peripheral hinge zones of the accumulator.

In relation to FIG. 11, the qualitative lay-out of a curve that represents the accumulation of energy obtained by the system is shown in FIG. 12. The curve shows, in the abscissa, the volume variations of the liquid and, in the ordinate, the pressure variations.

In relation to the embodiment shown in FIG. 11, there are quite schematically shown special means 26 for limiting the movement of the membrane—up to a substantially flat position relative to the starting position. These special means may be constituted by a stopping surface made intergral with the casing. The presence of the special means 26 allows for determining, with small variations in the volume of the liquid, considerable pressure variations; and hence, a decided elevation upwardly of the curve shown in FIG. 12, as pointed out with the broken-line portion of the curve labelled c.

The oleoelastic energy accumulator of the present invention is adapted for use in combination with other systems, for example, in the automotive field, such as for servo-brakes, powersteering, friction control, and the like.

A further usage for this invention is in conjunction with an urban water-supply network for absorbing unexpected variations in the hydraulic pressure.

Still another example for the useful application of the invention is in the field of industrial transports, such as, for example, motorbuses, trucks, and the like. In this latter, the accumulator is connected to the braking system. In particular, according to one embodiment, at the moment of braking it is possible to bring about the opening of a valve that, through a conduit controlled by said valve, allows for sending pressurized liquid, by means of an oleodynamic control, towards the interior of the casing of FIG. 1, while causing a bending through compression, during the passage of the membrane from its initial configuration to its final one, and consequently allowing for energy to be accumulated.

Subsequently, the accumulated energy can be restored, either via a special transducer mechanism for determining the starting of the vehicle's engine, or even for allowing one to operate devices for the shutting of car doors, for activating car direction indicators and other controls.

This invention finds use as a centralizing or stabilizing element in a suspension, either of engines or in entire vehicles. In this arrangement (FIG. 13), the space (already indicated in the previous figures) existing inside the accumulator casing, is occupied by oil—and this latter, again through the means of a flexible, non-expanding small tube 27, is connected to a shock absorber group, for example, of the type used in the "McPherson" automobile suspensions—formed, as is known, by a cylinder-piston unit 28, circumscribed by a spring and provided at one extremity by a buffer or block for the end-of-stroke limit.

In this arrangement that links the cited suspensions to the accumulator of the invention, what takes place is that, in the presence of any obstacle on the ground, the variation in the disposition of the wheel acts upon the cylinder-piston system of the "McPherson" group, and forces the liquid that is contained in the cylinder-piston group to exercise pressure variations upon the elastomeric membrane contained in the accumulator according to the present invention.

This embodiment can be adapted for determining a more or less high damping effect of the oscillations on the basis of the predetermined viscosity for the liquid.

As an alternative to what is known in the McPherson suspension, in the present invention the metallic spring that is disposed around the cylinder-piston unit may be omitted. In fact, in such a case, the elastic return carried out by the steel spring is guaranteed by the elasticity of the accumulator.

A system for accumulating energy, as described and illustrated in FIGS. 1 to 13, may be adapted for diverse uses and, in particular, for those uses where considerable pressure variations are required.

According to one example, the membrane may be subjected to pressures of up to 10 atmospheres and over, and receive thrusts of a considerable value as a function of the total surface forming the casing cover.

In all these embodiments, the thickness of the rubber is chosen in such a way as not to be subjected during the deformation to buckling under the critical load, i.e., in such a way as to prevent that, owing to insufficient thickness, the variation of the liquid in the casing is manifested, not with the pressure increases, but instead with negative pressure variations, as is shown by the broken-line d of FIG. 12.

The energy accumulator operates without having throughout its operation any rubbing whatsoever between the elastomeric membrane and the walls of the casing.

During its functioning, the membrane passes from its initial at-rest configuration to a final substantially flat configuration, through being gradually compressed, from the zone of the peripheral edge to the central zone, over its entire extent. In practice, this is with an effect comparable to that of a cylindrical helicoidal spring which is compressed between its two extremities.

In other words, during the phase of accumulating or discharging energy the membrane acts by itself, leaving for the other parts of the device the task of hermetically blocking the extremities and of containing the hydraulic pressure.

Therefore, since no phenomena of friction occur between the diverse parts of the device in movement, it is not possible to have any remarkable dissipation phenomena, and hence a desirably high output for the accumulator results.

Moreover, in the membrane the oleoelastic energy accumulator comprises both the element adapted for storing or for releasing energy, as well as the element directly subjected to the deforming thrust of the liquid for accumulating or returning energy. Therefore, in the present accumulator the liquid-membrane combination, in practice, constitutes a unique and single group devoid of any other mechanical thrust means whatsoever, as could, for example, be had with the state of the art, wherein the elastically deformable part, for example, is constituted by a piston that is, in its turn, actioned by a liquid.

Consequently, even the overall dimensions of the accumulator of the present invention may assume very reduced values, such as to be opportunely utilized for diverse cases.

In fact, the membrane-liquid configuration of the present accumulator allows, through opportunely varying and selecting the extension of the membrane surface, for transducing the pressures of the liquid to quite high thrust values, leaving the accumulator with a substantially flat form, and hence by its very nature, simple to apply to already-existing structures.

Other advantages aspects of the invention obviously originate from the characteristic combination of a membrane-liquid group. In practice, these two cited elements are closely connected and a variation of one results in an immediate variation of the other. In other words, and in particular with regard to a liquid having a low viscosity, for example, water and glycol in equal percentages, the system acts like a metallic spring and, as such, immediately restores the energy that has been accumulated as soon as the deforming cause ceases.

What is claimed is:

1. An oleoelastic energy accumulator for absorbing energy through compression of an elastomeric material, comprising;
   a rigid casing delimited by borders,
   at least one deformable elastomeric membrane having a central zone and a peripheral zone, said membrane being tightly sealed to said borders of the casing to delimit a closed space bounded by said casing and said membrane, said membrane having a convex configuration curved inwardly toward said closed space when in an at-rest position and a final flat configuration, said central zone and said peripheral zone having a thickness which is less than a thickness of a remaining portion of said membrane located between said central zone and said peripheral zone, said thickness of said remaining portion being between 0.3 and 0.6 times a distance between said central zone and said peripheral zone,
   a liquid disposed in said closed space to act on one side only of said membrane,
   means for limiting movement of said membrane, said membrane comprising means for enabling said membrane to pass from said convex configuration when at rest to said final flat configuration by means of a gradual compression over its entire extension with a resultant accumulation of elastic energy when subjected to pressure from said liquid, and to enable said elastic energy to be released when said pressure from said liquid is released.

2. Oleoelastic energy accumulator as defined in claim 1, characterized in that in said at-rest position, said membrane is already in a pre-compressed state.

3. Oleoelastic energy accumulator as defined in claim 1, comprising stiffening means (12) that are disposed substantially on the outer face of the membrane in the proximity of the casing borders.

4. Oleoelastic energy accumulator as defined in claim 1, wherein said membrane comprises a conical-shaped external surface (9) and an inner surface (10).

5. Oleoelastic energy accumulator as defined in claim 1, comprising relatively hard elements (24 and 25) englobed in the membrane material between the central zone and the peripheral zone.

6. Oleoelastic energy accumulator as defined in claim 1, comprising two inwardly convex elastomeric membranes (14 and 15) that are in contact with one another at the center (16), and applied and maintained, one respecting the other, in a precompressed state.

7. An apparatus comprising:
   (a) an oleoelastic energy accumulator for absorbing energy through compression of an elastomeric material;
   (b) a shock-absorbing oleodynamic piston-cylinder means including a movable piston;
   (c) said accumulator comprising:
      (i) a rigid casing delimited by borders,
      (ii) at least one deformable elastomeric membrane having a central zone and a peripheral zone, said membrane being tightly sealed to said borders of the casing to delimit a closed space bounded by said casing and said membrane, said membrane having a convex configuration curved inwardly toward said closed space when in an at-rest position and a final flat configuration, said central zone and said peripheral zone having a thickness which is less than a thickness of a remaining portion of said membrane located between said central zone and said peripheral zone, said thickness of said remaining portion being between 0.3 and 0.6 times a distance between said central zone and said peripheral zone, (iii) a liquid disposed in said closed space to act on one side only of said membrane, (iv) means for limiting movement of said membrane, and (v) said membrane comprising means for enabling said membrane to pass from said convex configuration when at rest to said final flat configuration by means of a gradual compression over its entire extension with a resultant accumulation of elastic energy when subjected to pressure from said liquid, and to enable said elastic energy to be released when said pressure from said liquid is released; and (d) a conduit made of a flexible material and having a non-deformable cross-section disposed between said closed space and the oleodynamic cylinder means, said liquid acting on said membrane for accumulating or restoring energy, as a function of movement of the piston inside the oleodynamic cylinder means.

* * * * *